United States Patent
Ewald et al.

(10) Patent No.: US 11,089,803 B2
(45) Date of Patent: Aug. 17, 2021

(54) GRANULAR FOOD COMPOSITION COMPRISING GAS

(71) Applicant: Conopco, Inc., Englewood Cliffs, NJ (US)

(72) Inventors: Ron Kai Jürgen Ewald, Asperg (DE); Christian Hugo Grün, Utrecht (NL); Holger Julius Mütsch, Gundelsheim (DE); Winfried Rupp, Bretzfeld-Rappach (DE)

(73) Assignee: Conopco, Inc., Englewood Cliffs, NJ (US)

( * ) Notice: Subject to any disclaimer, the term of this patent is extended or adjusted under 35 U.S.C. 154(b) by 510 days.

(21) Appl. No.: 15/536,028

(22) PCT Filed: Dec. 21, 2015

(86) PCT No.: PCT/EP2015/080787
§ 371 (c)(1),
(2) Date: Jun. 14, 2017

(87) PCT Pub. No.: WO2016/102462
PCT Pub. Date: Jun. 30, 2016

(65) Prior Publication Data
US 2017/0367384 A1  Dec. 28, 2017

(30) Foreign Application Priority Data

Dec. 22, 2014 (EP) .................................. 14199671

(51) Int. Cl.
*A23L 23/00* (2016.01)
*A23L 29/212* (2016.01)
*A23P 30/40* (2016.01)
*A23L 29/00* (2016.01)

(52) U.S. Cl.
CPC ............... *A23L 23/00* (2016.08); *A23L 29/00* (2016.08); *A23L 29/212* (2016.08); *A23P 30/40* (2016.08); *A23V 2002/00* (2013.01)

(58) Field of Classification Search
CPC ........ A23L 23/00; A23L 29/212; A23L 29/00; A23P 30/40; A23V 2002/00
See application file for complete search history.

(56) References Cited

U.S. PATENT DOCUMENTS 2,909,431 A 10/1959 Keller
4,232,052 A 11/1980 Nappen
(Continued)

FOREIGN PATENT DOCUMENTS

| AU | 3798768 | 11/1969 |
| CN | 1489438 | 4/2004 |
| CN | 1781379 | 6/2006 |
| EP | 2395846 | 1/2013 |

(Continued)

OTHER PUBLICATIONS

Spray_Drying and Spray Dryers, Nov. 2, 2009. http://class.fst.ohio-state.edu/Dairy_Tech/14Spraydrying.htm; 2009 ; (Year: 2009).*
Jun. 9, 2015.
IPRP2 in PCTEP2015080787, Nov. 9, 2016.
(Continued)

*Primary Examiner* — Cephia D Toomer
(74) *Attorney, Agent, or Firm* — Gerard J. McGowan, Jr.

(57) ABSTRACT

Granular food composition comprising: Fat, Starch; wherein the food composition comprises gas.

1 Claim, 3 Drawing Sheets

Slice 117, 3324 x 3324 pixels @ 2.92 µm = 9706 (inner diameter of tube approximately 8 mm)

(56) References Cited

U.S. PATENT DOCUMENTS

| | | | | |
|---|---|---|---|---|
| 4,568,551 | A * | 2/1986 | Seewi | A23L 23/00 |
| | | | | 426/307 |
| 4,810,518 | A * | 3/1989 | Haisman | A23K 50/60 |
| | | | | 426/578 |
| 5,127,953 | A * | 7/1992 | Hamaguchi | A21D 2/16 |
| | | | | 106/504 |
| 7,736,683 | B2 | 6/2010 | Zeller et al. | |
| 2002/0127322 | A1 * | 9/2002 | Bisperink | A23C 9/1524 |
| | | | | 426/570 |
| 2003/0203096 | A1 | 10/2003 | Hamm et al. | |
| 2004/0062847 | A1 * | 4/2004 | Koike | A21D 2/16 |
| | | | | 426/601 |
| 2005/0123668 | A1 * | 6/2005 | Kodali | A21D 2/165 |
| | | | | 426/601 |
| 2013/0251883 | A1 | 9/2013 | Ohsumi | |
| 2014/0205731 | A1 * | 7/2014 | Kloek | A23C 11/00 |
| | | | | 426/580 |
| 2016/0262431 | A1 * | 9/2016 | Ewald | A23L 29/212 |

FOREIGN PATENT DOCUMENTS

| | | |
|---|---|---|
| JP | 61104748 | 5/1986 |
| JP | 7284380 | 10/1995 |
| JP | 2001292744 | 10/2001 |
| JP | 2002060782 | 2/2002 |
| JP | 2004275089 | 10/2004 |
| NL | 6806990 | 11/1968 |
| WO | WO02062152 | 8/2002 |
| WO | WO02074096 | 11/2002 |
| WO | WO2006023564 | 3/2006 |
| WO | WO2007104326 | 9/2007 |
| WO | WO2010071425 | 6/2010 |
| WO | WO2015055431 | 4/2015 |

OTHER PUBLICATIONS

Search Report and Written Opinion in PCTEP2015080787, dated Mar. 23, 2016.
Written Opinion in EP14199671, dated Jun. 9, 2015.

* cited by examiner

Fig. 1

Slice 117, 3324 x 3324 pixels @ 2.92 µm = 9706 (inner diameter of tube approximately 8 mm)

Fig. 2

Slice 934, 3324 x 3324 pixels @ 2.92 µm = 9706 (inner diameter of tube approximately 8 mm)

GRANULAR FOOD COMPOSITION COMPRISING GAS

The present invention relates to a granular food composition comprising fat and starch. It further relates to a process to provide said food composition. It further relates to the use of aeration in a granular roux comprising fat and starch to reduce lump formation upon dilution in hot liquid.

BACKGROUND OF THE INVENTION

The present invention is in the field of granular roux products. A roux is used since classic time to thicken a liquid during cooking, in this way obtaining a thickened or viscous sauce or soup. A classic roux comprises fat, normally butter, and flour, in more or less equal amounts. The roux is traditionally in the form of a paste, resulting from melting the butter in a pan, adding the flour to it, and heating the mixture under stirring. The starch in the flour is believed to be responsible for the binding effect.

The preparation of a traditional roux is relatively time intensive. Both the preparation and the use of a traditionally prepared roux require experience from the chef. Preparation and use of a traditionally prepared roux involves the risks of burning, especially during preparation of the roux, and of lump formation, after addition of liquid, like water or bouillon.

Another complication is that the amount of roux that is required for a dish is difficult to anticipate in advance, and may depend for example on other ingredients that are present in the final dish. Therefore, often chefs feel the need to add additional roux during the cooking process. Preparing additional roux, to be added to the dish under preparation (to provide a so-called 'second binding') is cumbersome and not desired. Moreover, addition of roux to a semi-finished product like a sauce or soup that has been thickened already to some extent significantly increases the risk of lump formation, which is obviously not desired.

A problem observed with industrial roux products is the dosability. Dosability is improved by the use of granulation. Granulated roux products are known, but do not solve the above mentioned problems completely, for example the problem of lump formation.

Another problem observed in existing granular roux was that the level of ingredients that can be added to the roux, often referred to a 'formulation space', is sometimes considered too low. Simply said, all formulation space is used by flour to provide sufficient binding and by fat. This holds for example for colorants, in case a brown roux is desired, to prepare dark sauces. Also it might be desired to add flavour providing ingredients, for example in case the product is a soup or a sauce base, especially if this has in home applications.

An industrially prepared granular roux product has been disclosed in U.S. Pat. No. 4,568,551. A process is described which provides a roux that disperses readily in hot water and forms thick, creamy, lump free products. Starchy material is combined with edible fat into a homogenous mixture. Water is added and the mixture is subjected to heat treatment, cooled and grated.

The public becomes increasingly critical on fat-intake and therefore cooking products with a reduced fat content are desired.

The granular roux in U.S. Pat. No. 3,568,551 uses a relatively high level of fat, in relation to the level of starch. Fat reduction results in increased risk of lump formation. A digotomy seems present between high binding functionality and a low fat content. When a high binding effect is aimed for, either a product should be used which contains a high level of fat, next to a high level of starch, wherein the starch level in its turn is limited by the high fat content, or a high amount of a product should be used with a lower level of starch and a relatively low level of fat. The latter solution may also result in increased use of fat in the final dish.

JP 2001/292,744 relates to an air-containing solid roux having an air phase.

JP2004/275,089 relates to a foaming roux containing fat/oil, starch-based material, a flavour material and a foaming component.

WO2015/055431 relates to a food product comprising starch, from 15 to 50 wt % of fat, wherein the total amount of salt, monosodium glutamate and sugar taken together is less than 15 wt % of the weight of the food product, wherein the product is in the form of a paste and wherein the product has a density of between 0.6 and 1 kg/l at 20° C.

In view of the complications as set out above, the aim of the present invention is to provide a granular composition which provides good binding, while containing a relatively low level of fat, e.g. relative to the level of starch, which composition shows a low risk of lump formation upon use. More particularly, there is a need for a composition comprising more than 50 wt % of starch and less than 50 wt % of fat, or even less than 35% of fat and wherein preferably the risk of lump formation has been reduced. It is in particular preferred to provide such a composition with good binding-providing properties which also provides the safe option of adding the composition later in the cooking process to provide a good 'second binding' effect, with reduced lump formation. It is also preferred to provide such a composition which provides increased space for formulation, allowing the use of more additional ingredients such as flavour and color. In professional kitchens an industrially prepared roux composition is desired with the functionality as much as similar to a traditionally prepared roux, or even with better functionality, but which overcomes the complications involved in such a cumbersome product in terms of use (risk of lump formation) as well as preparation. It is desired that the roux composition is easy to dose.

A further aim is to provide a process to provide such a composition, which preferably is efficient. Preferably, such a process requires as less as possible modifications on an existing production line for preparing industrially prepared roux.

SUMMARY OF THE INVENTION

These aims have been met, at least partly, by a granular food composition comprising
Fat
Starch
wherein the composition comprises gas.

The invention further relates to a process to provide a food composition, the process comprising the steps of
a. Providing a mixture comprising starch and fat,
b. Providing a solid fat content of the fat in the mixture resulting from step a) of higher than 8 wt %, based on the weight of the fat,
c. Including gas in the mixture resulting of step b),
d. Allowing the mixture resulting of step c) to solidify,
e. Shaping the mixture resulting from step d),
wherein step a) further comprises heating the mixture, in case the mixture comprises gluten protein.

The invention further relates to the use of gas in a granular food composition comprising starch to prevent lumping upon dilution in a hot liquid.

DETAILED DESCRIPTION OF THE INVENTION

The food composition of the present invention comprises a mixture of fat and starch and is normally used to thicken an aqueous liquid. The food composition therefore is preferably a roux.

Percentages by weight (wt %) are based on the weight of the food composition, unless indicated differently.

Starch

The present invention comprises starch. Starch is believed to be responsible for the binding effect in the preparation of e.g. a soup or a sauce, when using a composition of the invention. Starch is preferably present in a total amount of from 25 wt % to 85 wt %, preferably of from 35 to 80 wt %, even more preferably of from 40 to 70 wt %, most preferably of from 45 to 60 wt %, based on the weight of the composition. Indeed, counterintuitively, in the context of the present invention, i.e. granulated products such as granulated roux, high starch levels contribute to reduced lump-formation. "Total amount" refers to all the starch present in the food composition. These levels of starch provided optimal binding functionality in use.

A composition can be preferred, for example, comprising:
from 25 to 85 wt % of total starch,
from 15 to 50 wt % of fat,
wherein the composition is in granular form and
wherein the composition comprises gas.

Starch preferably comprises starch from plant of the family of gramineae, or from tuber plants or from legumes or mixtures thereof. Preferably starch comprises one of wheat starch, rye starch, corn starch, rice starch, native potato starch, modified potato starch, tapioca starch, waxy corn starch, or mixtures thereof. Preferably the starch comprises wheat starch, waxy corn starch, native potato starch, modified potato starch or mixtures thereof. Preferably starch comprises wheat starch. Preferably starch comprises wheat starch in an amount of from 30 to 100 wt %, more preferably of from 50 to 90 wt %, even more preferably of from 60 to 80 wt %, based on the weight of the total starch content. Preferably, the composition comprises from 35 to 85 wt %, more preferably from 35 to 80 wt %, even more preferably of from 40 to 70 wt %, most preferably of from 45 to 60 wt % of wheat starch, based on the weight of the total composition.

The composition of the invention might contain gluten protein in an amount of from 5 to 14 wt %, preferably of from 4 to 12 wt %, preferably in an amount of from 6 to 10 wt %, based on the weight of the food composition. Gluten protein is normally present in case wheat flour is used as a source of starch.

The composition of the invention preferably comprises flour. Flour is preferably present in an amount of from 50 to 85 wt %, more preferably of from 55 to 80 wt %, even more preferably of from 60 to 75 wt %, even more preferably of from 65 to 75 wt %, based on the weight of the composition. As known to the person skilled in the art, flour contains starch and in case flour is present, flour is a source of starch. For example the composition can comprise from 50 to 85 wt % starch and from 60 to 85 wt % of flour. In this case (at least part of, preferably all of) the starch is encompassed in the flour.

A composition can be preferred, for example, comprising:
starch, wherein the composition comprises from 70 to 85 wt % of wheat flour, based on the weight of the composition
from 15 to 30 wt % of fat,
wherein the composition is in granular form and
wherein the composition comprises gas.

Fat

The food composition of the present invention comprises fat. Fat in the present context are triglycerides, and include oils and fats that are solid or liquid at 25° C. The terms oil and fat are used interchangeably. Fat is preferably present in the composition of the invention in an amount of from 15 to 50 wt %, based on weight of the food composition. Preferably fat is present in a total amount of from 20 to 50 wt %, even more preferably of from 25 to 50 wt %, even more preferably of from 20 to 40 wt %, even more preferably of from 23 to 35 wt %, most preferably of from 23 to 32 wt %. A relatively high fat content is known to reduce the risk of lump formation when using a traditional roux. It was observed that the present invention allowed a reduction of the fat level (i.e. a level which is lower than 50 wt %, or even lower than 40 wt %), compared to traditional roux, without increasing the formation of lumps, or even with a reduction in lump formation.

The total fat, preferably present in an amount as indicated above, preferably has a solid fat content at 20° C. of between 10 and 90 wt %, preferably of between 20 and 85 wt %, more preferably of between 60 and 85 wt %, even more preferably of between 75 and 85 wt %, most preferably of between 79 and 85 wt % (N20 79-85), based on the weight of the fat. It has preferably, preferably combined with this, a solid fat content at 30° C. of between 1 and 70 wt %, more preferably of between 2 and 66 wt %, even more preferably of between 30 and 66 wt %, even more preferably of between 50 and 66 wt %, most preferably of between 60 and 66 wt % (N30 60-66), based on the weight of the fat. The N20 79-85 and N30 60-66 solid fat levels provide a good granule structure even up to a storage temperature of between 25 to 30° C., whereas a lower solid fat content might require cooling to guarantee an optimal structure. The structure is relevant for the reduced lumping effect of the invention.

Solid fat means the solid material present in the fat. A lower level of solid fat at the indicated temperatures increases the risk that the granulated composition sticks together, which is not desired. A solid fat level higher than the indicated values, may be experienced by the consumer as too fatty in the mouth. It is preferred that the composition of the invention does not contain trans fatty acids. It is preferred that the composition does not contain hardened fatty acids. The concentration of trans fatty acid or of hardened fatty acids, preferably of both of them is preferably lower than 1 wt %, more preferably lower than 0.5 wt %, even more preferably lower than 0.1 wt %, most preferably is 0%.

The composition of the invention comprises preferably from 2 to 25 wt %, more preferably of from 2 to 20 wt %, even more preferably of from 2.5 to 15 wt % and most preferably of from 2 to 10 wt % of solid fat at 20° C., based on the weight of the composition. Solid fat means the solid material present in the fat.

Preferably fat comprises a fat selected from the group consisting of beef fat, palm oil, milk fat (also called butter fat) and mixtures thereof. Preferably the fat comprises palm fat, preferably in an amount of from 10 to 100 wt %, even more preferably in an amount of from 50 to 100 wt % based on the weight of the total fat, most preferably, the fat is palm fat, more preferably interesterified fat blend made up of palm stearin fractions. The food composition preferably comprises from 20 to 50 wt %, preferably from 20 to 40 wt %, even more preferably of from 23 to 35 wt %, most preferably of from 23 to 32 wt % of palm fat, having N20 79-85 and N30 60-66.

The melting point of the fat is preferably of between 20 and 70, more preferably of between 30 and 65° C., even more preferably of between 40 and 60° C., most preferably of between 50 and 60° C. The melting point is considered the lowest temperature at which the solids level according to ISO 8292 1D is below 0.5%.

Gas

Figure 1:
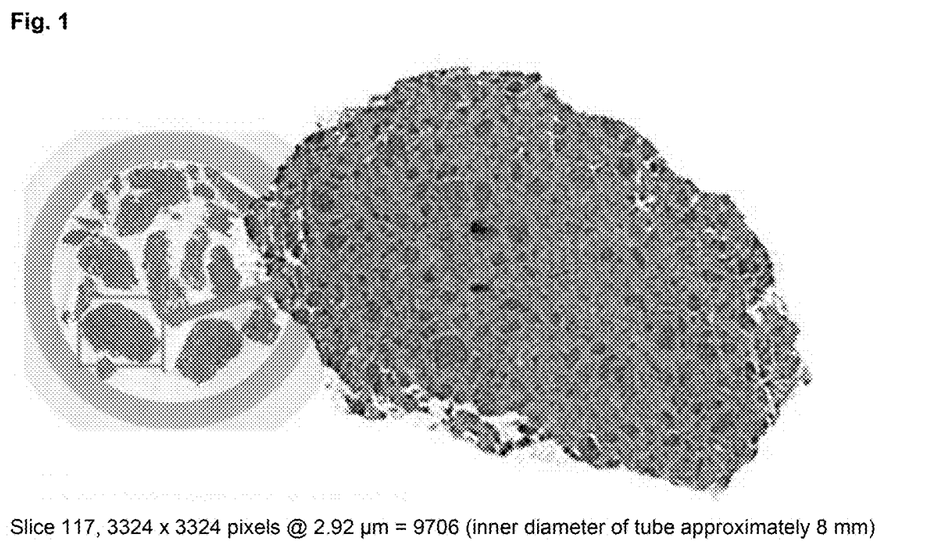
FIG. 1 shows an image of a non-aerated roux sample.
Figure 2:
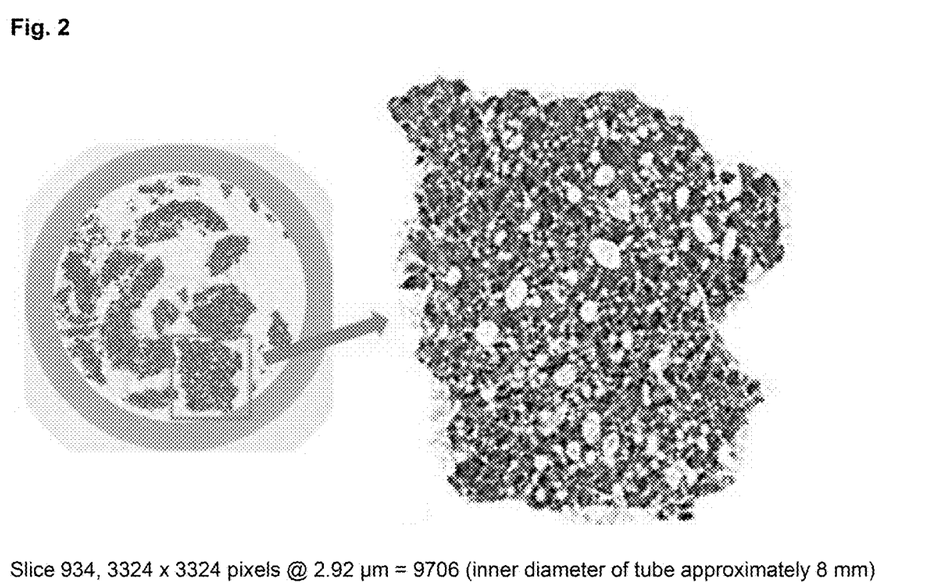
FIG. 2 shows an image of an aerated roux sample.
Figure 3:
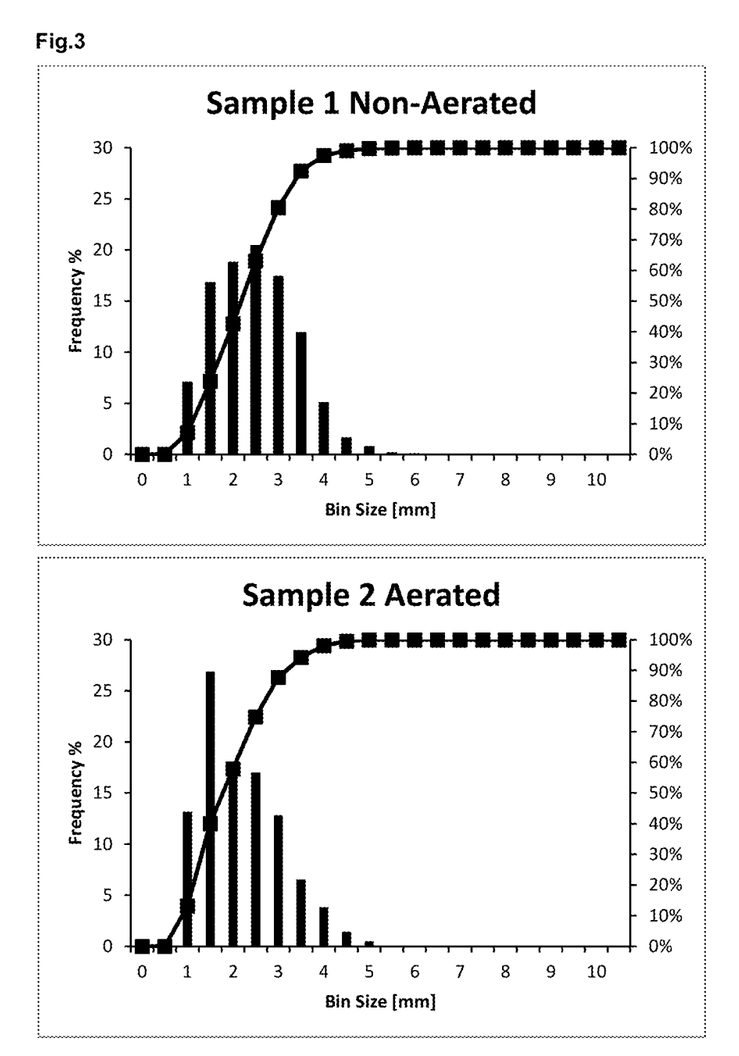
FIG. 3 shows graphs of bin size versus frequency for Samples 1 and 2.

The composition of the present invention comprises gas. The presence of gas can be visualised using for example X-ray tomography, wherein the gas is visible as vacuoles. FIGS. 1 and 2 show images of both aerated roux and non-aerated roux samples. The presence of gas results in porous particles and appeared to reduce formation of lumps during use, compared to a non-porous binding product, without gas. In addition, an improved second binding effect was observed, in terms that less lump formation was observed.

The gas preferably comprises nitrogen, preferably in an amount of from 70 to 100 wt %, more preferably 75 to 100 wt %. It can preferably contain 90 to 99 wt % or 95 to 98 wt % nitrogen, based on the total gas content of the composition. It can be preferred that the gas is nitrogen. The use of nitrogen is associated with a reduced risk of fat oxidation. The gas preferably is air.

The composition of the present invention preferably has a density of below 1 kg/L at 20° C.

Figure 4:
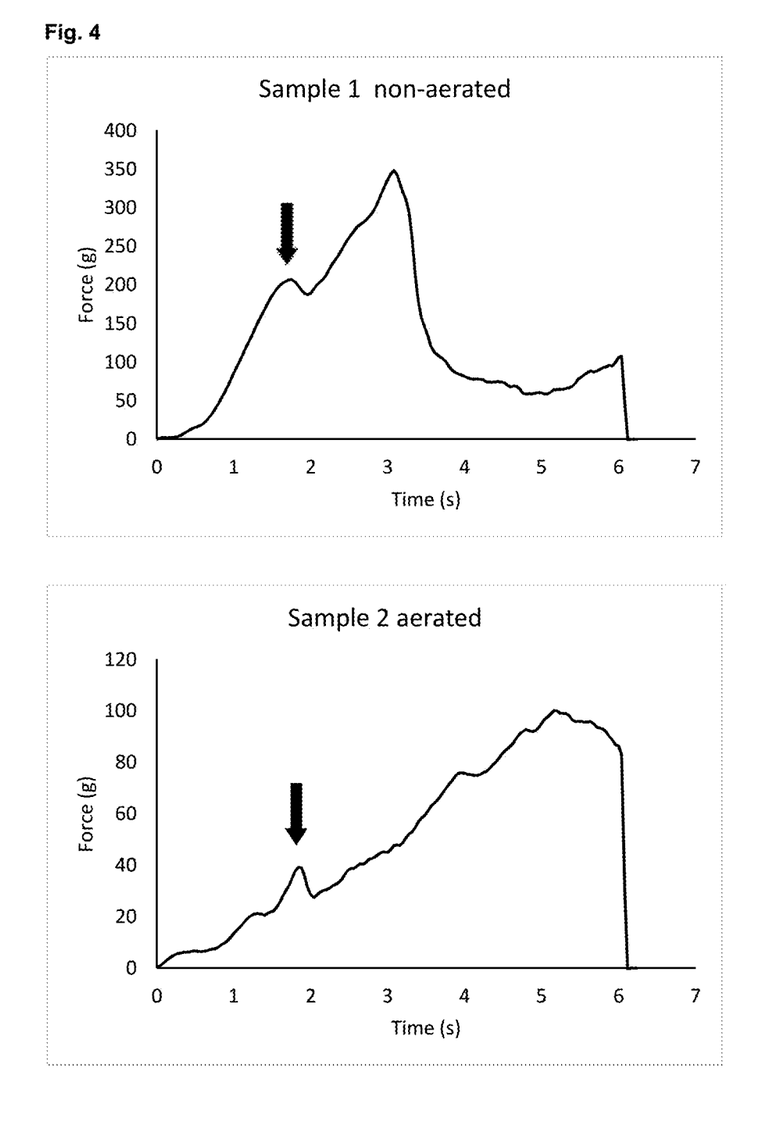
FIG. 4 is a graph showing the force required to produce the first fracture in Samples 1 and 2.

It was observed that the aeration of the pre-mature roux fat-starch/flour mixture is attended by an increase in brittleness (reduction in hardness). Without willing to be bound to theory, it is believed that the texture of the particles of the composition has a significant relation with the lumping behaviour in product application. It was observed that particles that could be compacted easily, showed reduced lumping behaviour, whereas the use of particles with a hard texture resulted in more lump formation. Brittleness of particles can be measured with a texture analyser. In general, a texture analyzer measures texture and quantifies the hardness, brittleness, fracturability, adhesiveness, stiffness, elasticity, bloom strength, etc. of foods, cosmetics, pharmaceuticals, gels, adhesives, and other chemical products. Non-porous particles are in general harder than porous particles made from the same material, and therefore, a higher force is needed to cause fractures. Furthermore, applying force to non-porous particles in general yields a limited number of fractures, resulting in distinct, sharp force peaks. Porous particles, on the other hand, will in general give a larger number of force peaks. Because of the lower force that needs to be applied to form fractures, force peaks are lower than in non-porous particles, resulting in a smoother curve. The force peak required to induce a first fracture resembles therefore a measure of the brittleness of a particle. Particles of the present invention showing a specific brittleness presented optimal lump reduction in application. Such a force peak analysis is conducted using the following protocol:

Protocol:
   Instrument: TA EXPERT Analyzer
   Load cell: 500 g calibrate cell before use
   Probe: 0.25 inch stainless cylinder
   Pretest speed: 0.5 mm/sec
   Test speed: 0.25 mm/sec
   Post test speed: 10 mm/sec
   Target Mode: distance
   Distance: 1.5 mm
   Trigger type: Force
   Trigger force: 0.1 g
   Individual particles are selected and analyzed by the texture analyzer. Several particles are selected per sample and results are averaged. Increased aeration leads to an increased probability of fracturing during the application of force. Moreover, the force needed to create a fracture will be inversely proportional with degree of aeration. Here, the force required to create the first fracture is averaged for several particles, e.g. 5 to 12, preferably 12, and averaged. This is a measure for the brittleness of a particle and expressed in gram. The test is carried out at room temperature. The procedure has been exemplified in Example 3 and FIG. 4.

Preferably the average brittleness (12 particles, average of the force needed to create first fracture) is lower than 200 grams, more preferably lower than 150 grams. It is preferably higher than 5 grams, more preferably higher than 10 grams, even more preferably higher than 20 g.

Other Ingredients

A problem that was observed in the preparation of granular roux, was that the space for ingredients besides fat and binder, like flour, was limited, if present at all. Especially if a colored roux is desired, a need exist to add coloring. It is preferred that the composition of invention comprises a colorant, preferably in an amount of from 1 to 15 wt %, more preferably in an amount of from 1.5 to 6 wt %, most preferably in an a amount of from 2 to 4 wt %. The composition of the invention preferably comprises a colorant that is chosen from malt extract or caramel, preferably in an amount of from 1 to 15 wt %, more preferably in an amount of from 1.5 to 6 wt %, most preferably in an a amount of from 2 to 4 wt %. Caramel includes compounds indicated as E150 a-d and natural caramel, such as e.g. caramelised sugar. It can be preferred that the composition of the invention is a roux with a brown color. Preferably, the composition comprises one or more of malt extract, caramel, plain caramel (E 150a), caustic sulphite caramel (E 150b), ammonia caramel (E 150c), sulphite ammonia caramel (E 150d), in a total amount of from 1 to 15 wt %, based on the weight of the composition.

The composition preferably resembles a home-made traditional roux, in terms of ingredients. Nevertheless some taste-providing ingredients can be present. These can be crystalline ingredient. Crystalline ingredients preferably comprise at least one of salt, such as sodium chloride, monosodium glutamate (MSG) and sugar. It is preferred that the total amount of crystalline ingredients, preferably the total amount of salt, monosodium glutamate and sugar taken together, is less than 15 wt %, preferably less than 10 wt %, even more preferably less than 5 wt %, or even more preferably less than 1 wt %. It can be preferred that salt (e.g. NaCl), MSG or sugar or all of them are present in an amount of less than 15 wt %, preferably less than 10 wt % even more preferably less than 5 wt %, even more preferably less than 1 wt %, most preferably are absent, provided that the total level of crystalline ingredients, preferably of salt, monosodium glutamate and sugar, taken together is less than 15 wt %. In the context of the present invention, "solid fat" is not part of the "crystalline material". Sugar is preferably sucrose.

Ingredients that are not recognised as natural are preferably not desired. For example the level of preservatives is preferably low, more preferably preservatives are absent. Effervescent agent or leavening agent, like CaCO3 and acids, is not desired and preferably absent because of reasons of labeling and of consumer perception as authentic ingredients are preferred. Moreover they result in unnatural behaviour during use. Spray dried fat, or lecithin are not desired. Spray drying is seen as artificial and is preferably not part of the process and the composition is preferably not spray dried. Although binders may be present, gelatine is preferably absent, as this is not desired by some consumer groups. Apart from gluten, other proteins are not desired and are preferably absent. The composition is preferably free from polyol or starch derivatives, like maltodextrin.

It is not preferred that water is present as the continuous phase. Preferably fat is the continuous phase. It is preferred that the amount of water is lower than 10 wt %, more preferably lower than 5 wt %. The amount of water can be of between 2 and 5 wt %, preferably of between 2.5 and 4 wt %. Most preferably no water is added as an ingredient during production of the composition.

It can be preferred that the composition of the invention comprises taste providing ingredients such as frozen or dried vegetables in a total amount of from 1 to 20 wt % based on the weight of the composition. Vegetables can include for example mushroom, tomato, onion, and/or carrot.

It can be preferred that the composition of the invention is free from herbs and spices. It can be preferred that the level of herbs and spices, is less than 10 wt %, even more preferably less than 8 wt %. Flavours, e.g. herbs and spices, can be present in an amount of from 0 to 10 wt %, preferably of from 2 to 6 wt %.

It may be preferred that the composition of the present invention further comprises a gum, which is not starch. Such gum is preferably one of the group selected from xanthan gum, guar gum, locust bean gum, konjac mannan, cassia gum, pectin and mixtures thereof. Preferably, the composition comprises xanthan gum. If present, these ingredients are present in the inactive, i.e. unswollen, form.

Preferably, the present invention relates to a composition which is in the form of a roux comprising:
from 35 to 60 wt % of starch, based on the weight of the composition, wherein starch comprises wheat starch, preferably in an amount of from 50 to 100 wt % based on the weight of the starch,
from 23 to 35 wt % of fat, having N20 79-85 and N30 60-66,
wherein the composition is in granular form and
wherein the composition comprises gas.

The food composition is in granular form. A granular form is known to the person skilled in the art. This granular form can be for example in the form of flakes, agglomerates, or granules, most preferably flakes. Flakes are normally produced by a process called grating, wherein the composition is worked through a maze. Preferably, more than 80%, even more preferably between 80 and 98 wt % of the particles of the composition has a size of between 0.5 mm and 6 mm, more preferably of from 1 to 5 mm. It can be preferred that from 84 to 96 wt % of the particles have a size of between 1 to 4 mm. It can be preferred that from 84 to 96 wt % of the particles have a size of between 1 to 4 mm. Preferably, 5 wt % or less of the particles has a size of lower than 1 mm.

The composition is preferably homogenous. In case particles are present, these are preferably homogenously distributed throughout the composition. Starch and fat are preferably homogenously distributed. Fat and starch are preferably not present as individual granules. The composition is preferably a fat-continuous composition. The composition of the invention is preferably solid at a temperature of between 25 and 30° C.

The composition of the invention is preferably a roux. It can be preferred that the composition of the invention is packaged.

Process

Amounts, preferred amounts, ingredients and preferred ingredients etcetera as specified for the composition apply also for the process, mutatis mutandis.

The invention further relates to a method for preparing a food composition of the invention. Consequently, the invention relates to a method for preparing a food composition, wherein the method comprises the steps of:
a. Providing a mixture comprising starch and fat,
b. Providing a solid fat content of the fat in the mixture resulting from step a) of higher than 8 wt %, based on the weight of the fat,
c. Including gas in the mixture resulting of step b),
d. Allowing the mixture resulting from step c) to solidify,
e. Shaping the mixture resulting from step d),
wherein step a) further comprises heating the mixture, in case the mixture comprises gluten protein.

Step a), Mixing

In step a) of the method of the invention, fat is mixed with starch.

The amount of fat present in the mixture in step a) is preferably of from 15 to 50 wt %, preferably of from 20 to 40 wt %, most preferably of from 23 to 35 wt %, based on the weight of the resulting food composition.

Fat is preferably in liquid form when combined with the starch. To this end, preferably the process comprises a step of heating the fat until melted, before mixing it with the starch. In the present invention, the fat preferably comprises palm fat, preferably the fat is palm fat, as set out in the description of the composition of the invention.

Starch, is preferably added in an amount of from 25 wt % to 85 wt %, preferably in an amount of from 35 to 80 wt %, even more preferably of from 40 to 70 wt %, most preferably of from 45 to 60 wt %, based on the weight of the resulting composition. The starch can be added in the form of starch powder, preferably as wheat starch, rye starch, corn starch, rice starch, potato starch, tapioca starch or a mixture thereof. Preferably the starch is added as wheat starch.

It is preferred that starch is added, preferably that at least part of the starch is added, in the form of flour, preferably in the form of wheat flour. Flour is added during step a), preferably in an amount of from 50 to 85 wt %, preferably of from 55 to 80 wt %, even more preferably of from 60 to 75 wt %, most preferably in an amount of from 65 to 75 wt %, based on the weight of the resulting food composition.

It is preferred that when flour is added, the amount of starch added in the form of starch powder added to the mixture of step a) is low, preferably is in an amount of less than 10 wt %, more preferably in an amount of less than 5 wt %, even more preferably in an amount of less than 1%, based on the weight of the resulting composition, preferably is absent. In this way the starch is predominantly provided by flour.

Flour comprises preferably flour from gramineae or tuber plants or from legumes or mixtures thereof. Flour comprises preferably one of the group consisting of wheat flour, rye flour, corn flour, potato flour or mixtures thereof. More preferably, the flour comprises wheat flour, most preferably, the flour is added in the form of wheat flour. Preferably the flour comprises wheat flour in an amount of from 30 to 100 wt %, more preferably of from 50 to 100 wt %, even more preferably of from 60 to 95 wt %, based on the total weight of the flour.

It can be preferred that the composition comprises additional ingredients, like flavour. Preferably additional ingredients, e.g. flavours or spices are added to the mixture during the mixing step a).

Mixing can be carried out as known in the art, for example in a mixer from Stephan™. Mixing is normally carried out until a homogenous mixture is obtained. Preferably mixing is carried out at a temperature above the melting temperature of the fat.

Optional Heating Step

Especially in case the mixture of step a) comprises gluten protein, step a) preferably after mixing, comprises heating of the mixture comprising fat and starch. Gluten protein is normally present in case flour is used in the mixture of step a) wherein the flour is derived from seeds from the tribe Triticeae, which includes for example wheat, barley and rye. Obviously, in case the flour contains inactivated gluten protein, e.g. as a consequence of heat-treatment, the heating step of the current process is not essential, as will be understood by the skilled person. Heating in this step is preferably carried out to a temperature of above the melting temperature of the fat. Heating is preferably carried out to a temperature of the mixture of between 100° C. and 150° C., preferably of from 110° C. to 130° C., preferably the heating period at these temperatures is carried out until a water content is reached of the composition of below 5.4 wt %. As known to the person skilled in the art, the time required depends on the batch size, but can for example be for a time of between 10 and 40 minutes, preferably of between 15 and 30 minutes, most preferably of between 15 and 20 minutes. Heating to a temperature of between 100° C. and 150° C., preferably of from 110° C. to 130° C. is preferably present in case gluten containing flour, such as from wheat, barley or rye, is added to the mixture of step a). In this case, the gluten proteins in the flour are inactivated by the heating. It was observed that a heating step results in a composition that provides a creamier texture and appearance of the soup or sauce, when the composition of the invention is used to provide viscosity. Absence of a heating step results in a more slimy texture and appearance, which is not appreciated by many consumers.

Especially when the process of the invention comprises the step of grating or granulation, to obtain the granular appearance, a heating step is desired. Absence of this heating step results in sub-optimal quality.

The water level of the mixture is preferably lower than 4.5 wt %, preferably lower than 4 wt %, preferably of between 2.5 and 4.5 wt %, based on the weight of the composition. Preferably no water is added before or during the heating step.

Addition of Other Ingredients

After the above described step a), it may be preferred that taste or color providing ingredients are added. These can include for example frozen or dried vegetables for example in an amount of from 1 to 20 wt % or can include a colorant in an amount of preferably 1 to 15 wt %, preferably of from 1.5 to 6 wt %, even more preferably of from 2 to 4 wt %, based on the weight of the final composition.

Step b) Arranging Solid Fat Content

Before carrying out the inclusion of gas in step c), it is important that the solid fat level of the mixture is of a specific level to allow proper gas inclusion. It was found, that the level of solid fat was higher than 8 wt % (based on the weight of the total fat in the composition). The level of solid fat is preferably below 60 wt % (based on the weight of the total fat in the resulting composition), more preferably below 55 wt %, even more preferably of between 8 and 53 wt %, even more preferably of between 20 and 50 wt %, even more preferably of between 35 and 40 wt % (based on the weight of the total fat in the resulting composition). It can be preferred to be of between 8 and 40 wt % (based on the weight of the total fat in the resulting composition). It is preferred that the level of solid fat, preferably of between 35 and 53 wt % (based on the weight of the total fat in the resulting composition), is present at a temperature of between 35 and 40° C. Too much solid fat, e.g. more than 50 wt %, based on the weight of the total amount of fat in the resulting composition at 25° C., or for example more than 40 wt % at the moment of inclusion of gas, is believed to result in suboptimal inclusion of gas (e.g. aeration). If the level of solid fat is too low, e.g. lower than 8 wt % based on the weight of the total amount of fat in the resulting food composition, the resulting composition is expected to be too runny, and therefore is expected that it cannot keep the gas inside the composition, e.g. because the texture collapses.

When the optional heating step has been carried out in step a), the mixture resulting from step a) is cooled, in order to provide the required solid fat content before including the gas. Cooling includes the meaning that the mixture is allowed to cool down. The mixture is cooled until a solid fat content is reached of preferably higher than 8 wt %. The mixture is preferably cooled until a solid fat content is reached of lower than 60 wt % (based on the weight of the total fat in the resulting composition), more preferably below 55 wt %, even more preferably of between 8 and 53 wt %, even more preferably of between 20 and 50 wt %, even more preferably of between 35 and 40 wt % (based on the weight of the total fat in the resulting composition). It can be preferred to be cooled to reach a solid fat content of between 8 and 40 wt % (based on the weight of the total fat in the resulting composition). It is preferred that the level of solid fat, preferably a level of between 35 and 53 wt % (based on the weight of the total fat in the resulting composition), is present after cooling to a temperature of between 35 and 40° C.

The level of fat crystallisation can be measured as known in the art, for example using NMR technology. As will be clear for the person skilled in the art, the temperature to which the mixture should be cooled will depend on the type of fat that is present in the mixture.

If needed, arranging the solid fat content, for example of between 8 and 60 wt % based on the weight of the total fat in the resulting composition, may comprise heating, e.g. until the desired level of solid fat content is reached.

Accordingly, the invention preferably relates to a method for preparing a food composition, the method comprising the steps of:
  a) Providing a mixture comprising fat and starch,
  b) Providing a solid fat content of the fat in the mixture resulting from step a) of higher than 8 wt %, based on the weight of the fat,
  c) Including gas to the mixture resulting from the cooling step, d) Allowing the mixture resulting from step c) to solidify,
e) Shaping the mixture resulting from step d), wherein step a) further comprises heating the mixture and step b) comprises cooling, in case the mixture comprises gluten protein.

Step c, Inclusion of Gas

In step c), gas is included into the mixture. The gas is added after the optional heating and subsequent optional cooling step. It can be preferred for example that ingredients are used comprising gas, but it is preferred that gas is added by aeration/foaming, e.g. by whipping the mixture. Adding gas appeared most successful and is preferably done at a specific level of solid fat in the mixture.

Gas is preferably air. Gas preferably is included till a density is reached of the mixture of from 0.6 to 0.99 kg/l, preferably of from 0.7 to 0.9, most preferably of from 0.75 to 0.85 kg/l. Gas inclusion is for example carried out until an overrun is reached of from 10 to 70%, preferably of from 20 to 65%, most preferably of from 30 to 60%. Gas inclusion is carried out preferably until a gas content is reached in the resulting composition of between 10 and 40%, preferably of from 38 to 22%, compared to the composition to which no gas is added. This percentage is calculated by the following formula, wherein an aerated (gas-containing) product and non-aerated product are compared in a respective cup of a certain fixed volume:

$$\text{Percentage of gas} = 100 - [(m_3 - m_1)/\{(m_2 - m_1)/100\}].$$

$m_1$=weight of the cup (g)
$m_2$=weight of the cup including non-aerated product (g)
$m_3$=weight of the cup including aerated product (g)

A calculation example has been included in hypothetical Example 2.

The gas is preferably present in an overrun of the product of from 10 to 70%, preferably of from 30 to 60%. This percentage is calculated by the following formula, wherein an aerated (gas-containing) product and a non-aerated product are compared in a respective cup of a fixed volume and $m_1$, $m_2$, and $m_3$ have the meaning as indicated above:

$$\text{Percentage of overrun} = [(m_2 - m_3)/(m_3 - m_1)] \times 100$$

It is preferred if the gas comprises nitrogen. Gas can be air. It is preferred if the gas is nitrogen gas ($N_2$).

Gas is suitably included by machinery as known in the art, for example SPX from Schröder.

Step d), Solidifying

After the addition of gas to the mixture, the mixture is solidified, preferably by cooling. Cooling results in further crystallisation of the fat. Cooling preferably comprises cooling via a cooling belt. This is conveniently done by bringing the mixture comprising the gas on the cooling belt. Cooling is carried out preferably until a crystallization of fat is reached that the level of solid fat is higher than 45 wt %, preferably of between 45 and 90 wt %, more preferably of 48 and 85 wt %, even more preferably of between 60 and 85 wt %, based on the weight of the total fat. As known in the art, the level of crystallisation can be adjusted by adjusting the speed of the belt. The composition is preferably cooled to a temperature below the crystallisation temperature of the fat. Cooling is preferably carried out to a temperature of between 18 and 32° C. using a cooling belt of this temperature. The cooling step is especially desired in case the shaping step involves grating. Higher degrees of solid fat (e.g. lower temperature) result in a higher porosity, which results in less lumping during use.

Step e) Shaping

The process of the invention comprises a shaping step. Shaping conveniently comprises a process of milling, granulating, grating, agglomeration, or extrusion. Preferably, shaping comprises milling or grating, more preferably, comprises grating. Grating is normally carried out by introducing the composition resulting from the solidification step d), which is normally in the form of a layer that is solid, for example because the fat has been crystalised or is partly crystallized, into a grating device. The fat preferably comprises a solid at level of between 48 and 85 wt % based on the weight of the total fat. The temperature during the shaping is preferably of from 20 to 34° C.

During grating, the composition is worked through a mesh, resulting in particles. The size of the particles can be adjusted, for example, by the size of the mesh. The mesh size is preferably of between 2 and 8 mm, more preferably of between 3 and 6 mm. Shaping is preferably carried out until a particle size distribution is reached wherein more than 80%, even more preferably between 80 and 98 wt % of the particles of the composition has a size of between 0.5 mm and 6 mm, more preferably of from 1 to 5 mm. It can be preferred that from 84 to 96 wt % of the particles have a size of between 1 to 4 mm. It can be preferred that from 84 to 96 wt % of the particles have a size of between 1 to 4 mm. Preferably, 5 wt % or less of the particles has a size of lower than 1 mm.

To achieve the desired size distribution, it may be preferred that shaping is followed by a sieving step.

Packaging

The composition resulting from the shaping step e) is normally packaged. The composition is preferably packaged in a tub or a container. Preferably the composition is packaged in a container.

Hence, preferably, the present invention relates to a process to provide a food composition, the process comprising the steps of:

a) Providing a mixture comprising fat and starch, wherein the starch comprises wheat starch, and the starch is provided by wheat flour, followed by heating the mixture to a temperature of between 100 and 150° C., and
b) Providing a solid fat content of the fat in the mixture resulting from step a) of higher than 8 wt %, based on the weight of the fat, wherein the step b) involves cooling,
c) Including gas to the mixture resulting from the cooling step, until an overrun is reached of between 10 and 70%,
d) Solidifying the mixture resulting from step c), wherein solidifying comprises cooling, till the fat has been crystalised to a level of between 45 and 90 wt %, preferably 60 to 85 wt % (wt % based on weight of total fat),
e) Shaping the mixture resulting from step d) wherein the shaping comprises grating or milling,
f) Packaging the mixture resulting from step e).

The invention further relates to a composition which is obtainable by, preferably, which is obtained by the process of the present invention.

Use

In a further aspect, the present invention relates to the use of a composition according to the invention to increase the viscosity of an aqueous liquid or to provide a viscous soup or sauce. This preferably involves the step of adding the composition of the invention to an aqueous liquid or adding an aqueous liquid to the composition of the invention, followed by mixing them. Aqueous liquid is preferably water or bouillon or milk but can be a semi-finished product such as a soup or sauce. Such a semi-finished product is a product that has not reached the desired end-viscosity and needs additional binding (second binding) to achieve the final viscosity desired for consumption. The semi-finished product preferably has a viscosity of higher than 1 and lower than 300 Pa·s, preferably higher than 20 and lower than 200 Pa·s. Preferably mixing is carried out while the mixture is heated, preferably to a temperature of between 50 and 100° C., preferably of between 60 and 95° C. Mixing and/or heating is carried out until the desired viscosity is reached. Preferably the composition of the invention is mixed with the aqueous liquid in a weight/weight ratio (composition: aqueous liquid) of from 1:8 to 1:15, preferably in a ratio of from 1:10 to 1:13. It might be envisioned by the skilled person that the problems relating to lump formation are more serious at low dissolution ratios. The present invention aims to provide for a robust composition which even at low dilution ratios results in minimal formation of lumps.

When using the composition of the invention and using water as aqueous liquid in the preferred ratios the viscosity of the resulting viscous liquid is preferably of between 100 and 800 mPa·s, more preferably of between 200 and 700 Pa·s at 70° C. Preferably, 100 grams of composition of the present invention, when mixed with 1 litre of water, and heated to a temperature of 70° C. results in a viscosity of between 100 and 600 mPa·s, preferably of from 200 and 500 mPa·s. These values are measured as known to a person skilled in the art of rheology. The measurement is carried out at 70° C., and a shear rate of 50 1/s, using a Rheometer (e.g. AntonPaar MCM 102) and a measuring system of CC27-SN28453 (cylindric system).

When a viscous soup or sauce is prepared, the skilled person knows that additional ingredients can be added to the viscous product resulting from the dilution of the composition of the present invention in an aqueous liquid.

The invention further relates to the use of gas inclusion preferably by air or N2 incorporation, in a granular food composition comprising fat and starch, to reduce lumping upon dilution in a hot liquid.

The invention will now be exemplified by the following non-limiting examples:

EXAMPLES

Example 1

Roux samples 1-3 were prepared according to the following protocol:
Ingredients:
Fat: palm fat (refined interesterified fat blend from palm stearin fractions) having a fat specification of N20 79-85 and N30 60-66
Wheat flour: less than 15% moisture, 9 to 13 wt % total protein.
Mixing/Sweating was carried out as follows: Preheated fat (90° C.) was mixed with wheat flour in a ration of 70% flour and 30% fat (or amounts indicated in the Table below) in a cutter (Stefan™), and heated up to 120° C. The heating/sweating time was approximately 20 minutes.

The resulting mix was cooled to a temperature of 35 to 40° C. (SPX-Gerstenberg-Schroeder™). Then, the mix was transferred to the aeration device Mondomix™), wherein $N_2$ was included in the roux mixture by continuous high shear mixing of the pre-crystalised roux. Temperature after aeration was approx. 40 to 45° C. The added amount of nitrogen was 100 cm3/min, and the speed of the mixing head was 450 rpm. Target density was 0.85 kg/L of the mixture.

The resulting gas-comprising mixture was cooled on a cooling belt to a temperature of 18° C. to 32° C. The temperature at grating was 23-25° C. Grinding of the solidified roux was done by using a grating device (Solia™) with a mesh size of 4 mm.

The roux samples were tested for lump formation in boiling water. The amount of roux sample was adjusted to an amount that provides a comparable level of viscosity in the end product (see table). The comparative test was carried out with a comparative sample comprising 40 wt % of fat (not aerated), a comparative sample comprising 30 wt % of fat, and a sample comprising 30 wt % of fat, wherein the roux sample was aerated.

The test was carried out by the following protocol:
Preparation:
  put a pan on the stove
  place a stirrer in the middle of the pan, stirring speed 250 rpm
  bring 2.000 g water to boil
  when the water is boiling add ¾ of the roux sample
  reduce heating to prevent over boiling (water leaving the pan)
  after 15-30 seconds reduce heating to allow a slow simmer-boil
  let it boil for 1 minute
  add the remaining ¼ of the roux sample
  continue boiling for additional 2 minutes at slow simmer-boiling, stir from start to end with 250 rpm"
Measurement
  make sieve wet, mesh size 0.5 mm
  weigh the weight of the sieve
  add 1500 g warm water to the boiled water-roux sample mixture and stir carefully, to dilute the sauce and making sieving easier
  sieve the complete liquid mixture including roux through the sieve
  flush sieve with 500 g warm water, to remove all sauce from the sieve and keep the lumps behind
  measure weight of sieve
  calculate the lump formation by subtracting the weight of the sieve from the weight of the sieve containing the lumps.

Each test was repeated 4 times, and an average value of lump formation, including the standard deviation, has been depicted in the table below. The results have been indicated in grams and in percentage from the original roux sample.

The samples and results are indicated in the table below.

| sample | Comp. Ex. 1 | Comp. Ex. 2 | Ex. 3 |
| --- | --- | --- | --- |
| Roux variety/ description | No aeration 40% fat | No aeration 30% fat | $N_2$ aerated 30% fat |
| initial weight (g/l): | 100 | 90 | 90 |
| fat (wt %): | 40 | 30 | 30 |
| Wheat flour (wt %) | 60 | 70 | 70 |
| Average lumps (g) | 33.8 | 123.3 | 21.8 |
| SD (g) | 5.3 | 6.3 | 3.8 |
| Average lumps (%) | 16.9 | 68.5 | 12.1 |
| SD (%) | 2.6 | 3.5 | 2.1 |
| Viscosity (Pa · s) | 263 (100 g/L) | 276 (90 g/L) | 276 (90 g/L) |

From the results it becomes clear that aeration significantly reduces the level of lump formation. For a fat level of 30 wt % and 70% flour, Comp. Ex. 2, the level of lump formation becomes very high (68.5%), which can be reduced to a level of 12.1% when $N_2$ aeration is used (Comp. Ex. 3). The level of lump formation is even lower than the level observed for a fat level of 40 wt % and 60 wt % flour (16.9%, Comp. Ex. 1). Compared to Comp. Ex. 1, this example shows that by using aeration, the level of fat can be reduced (from 40 to 30 wt %), the binding capacity is increased (from 60 to 70 wt % flour) and the lump formation has been reduced (from 16.9 to 12.1%).

Example 2

Calculation Example

The following hypothetical example is prepared following the process used in example 1.

| Roux | Wt % |
|---|---|
| Fat/oil | 30 |
| Wheat Flour | 70 |

The density of the pre product (not grated) is 0.77 kg/L. The gas content 29.5%. The gas content is calculated as follows:

| Volume of the cup in use: | 10.71 | ml |
|---|---|---|
| Weight of empty cup: | 23.15 | g (m1) |
| Weight of cup + unaerated product: | 35.0 | g (m2) |
| weight of cup + aerated product (g) | 31.5 | g (m3) |

Percentage of gas=100−[($m_3$−$m_1$)/{($m_2$−$m_1$)/100}]=
100−(31.5−23.15)/(35−23.15)/100=29.5%

Example 3

Brittleness Measurements

The brittleness of 6 samples (3 aerated, 3 non-aerated) was analysed using texture analysis, according to the protocol as described in the specification. The granules were prepared according to the procedure and type of ingredients (70% wheat flour, 30% fat) of Example 1. Target density of the mixture after aeration was 0.85 kg/L. Grating was carried out at a temperature of between 27 and 29° C.

Samples
1. NON Aerated Roux
2. Aerated Roux
3. NON Aerated
4. NON Aerated
5. Aerated
6. Aerated Individual particles (aerated and non-aerated) were selected and the force required to produce the first fracture (see FIG. 4) was analyzed by the texture analyzer. Several particles were selected per sample and results were averaged.

Results

As explained above, increased porosity will lead to an increased probability of fracturing during the application of force. Moreover, the force needed to create a fracture will be inversely proportional with degree of aeration. The particles requiring less force to break provided less lumping in cooking application. Here, the force required to create the first fracture has been measured for a number of aerated as well as non-aerated samples. The experimental data are given in the table below:

| Sample ID | Average force (g) (n = 12) | Lump formation (g) |
|---|---|---|
| 1. NON Aerated | 277 | 171 |
| 2. Aerated | 43 | 92 |
| 3. NON Aerated | 272 | 122 |
| 4. NON Aerated | 201 | 130 |
| 5. Aerated | 150 | 102 |
| 6. Aerated | 49 | 87 |

The figure below shows to typical examples of the force measurement. The arrows indicate the first fracturing point used to determine the average force in the table.

The experiment shows that the increase in porosity provides the increase in brittleness and an decrease in lumping. Samples 1, 3, 4 are comparative examples. Example 5, showing less porosity, shows an intermediate level of lump formation. This was thought to be due to the fact that Example 5 was grated at the highest temperature (29° C.), compared to the other aerated samples (27° C.). Note in this respect that the lumping rates of the aerated samples of Example 1, grated at lower temperatures, are lower than these observed in Example 3. It is shown that limited aeration provides insufficient porosity/brittleness increase and limited associated lump reduction.

Example 4

Roux samples prepared according to the process of example 1, but comprising 39% fat were compared. Sample 1 was aerated with N2 gas, sample 2 was not aerated. Samples 1 and 2 correspond with the first two samples of Example 3.

3D Structure Characterisation by Micro-CT

A small amount of the material (granules) was poured in a poly-carbonate tube with a inner diameter of approximately 8 mm which was closed with a screw cap.

The tube was scanned in a Skyscan 1172-A x-ray microtomograph. The following settings were used;

| XRT-run | 313 | 314 |
|---|---|---|
| Sample | 01 | 02 |
| Description | Roux Non-Aerated | Roux Aerated |
| Pixel Size | 2.92 | 2.92 |
| Rotation Step | 0.25 | 0.25 |
| Frame averaging | 3 | 3 |
| 360 scan | no | no |

The acquired collection of 817 projection images are then reconstructed with NRECON reconstruction software (V1.6.9.4). The reconstructed set was processed with Avizo (V8.1.1) to produce vertical cross-sections. The micro-CT scan yields a stack of images (1872 slices) representing a (gross) volume of 3324×3324×1872 pixels (pixel size=2.92 μm), which is approximately 515 mm³.

The reconstructed slices reveal differences between the two samples. See images below zoomed in on a single particle. The non-aerated material (FIG. 1) has mostly compact granules, with cracks at the outside. This may explain why the granules are so brittle. Some of the aerated granules indeed show air inside (FIG. 2), but from the 2D slices it is difficult to determine if these are air bubbles or canals. A 3D visualisation indicates it are mostly channels.

It can be concluded that the particles which have not been aerated show a compact texture and do not show air vacuoles and canals throughout their body (FIG. 1), whereas aerated particles comprise air vacuoles and canals throughout their body, as clearly visible in FIG. 2.

Example 5

Particle Size Distribution by Image Scanning

Granules as used in Example 4 were carefully placed on the glass plate of a HP photo scanner G4050, ensuring a representative amount was imaged. Scan setting were set to use automatic lighting. Scan resolution was 600 dpi. These scans yield greyscale TIFF images with a pixel size of 0.0423 mm. This was repeated three times for each sample.

The TIFF images were processed and analysed using FIJI/ImageJ software (V1.49K) using the following procedure;
For size characterisation it is reported in equivalent circle diameter calculated from the area of the particles Three photo's were analyzed per sample and merged into a single table. From the equivalent diameter a histogram with bin size of 0.5 mm was created. The frequency was expressed as a fraction of the total (effectively giving the percentage of the total for each bin).

For the non aerated granules, the ellipse fitting (major diameter) yields a mean length of 2.6 mm, and ferret method gives 2.8 mm. For the aerated these are 2.3, and 2.5 respectively.

Example 6

Granulated roux samples were prepared according to the following protocol:
Ingredients:
Fat: palm fat (refined interesterified fat blend from palm stearin fractions) having a fat specification of N20 79-85 and N30 60-66
Wheat flour: less than 15% moisture, 9 to 13 wt % total protein.

Mixing/Sweating was carried out as follows: Preheated fat (90° C.) was mixed with wheat flour in a ratio of 70% flour and 30% fat (or amounts indicated in the Table below) in a pan and heated up to 120° C. The heating/sweating time was approximately 20 minutes.

Further dry ingredients (e.g. curry powder, salt, sugar etc.) were added to the sweated wheat flour and palm fat mix while stirring.

The mass was cooled down to T=35-40° C. ° C. in a cold water bath, which resulted in a solid fat content of 18 wt % based on fat content.

The mix was aerated with air at 35-40° C. to reach a density <1 kg/L, using a mixer of Hobart™.

The resulting gas-comprising mixture was cooled to a temperature of 18° C. to 32° C. The temperature at grating was 23-25° C. Grinding of the solidified roux was done by using a grating device with a mesh size of 4 mm.

The roux samples were tested for lump formation in boiling water. The amount of roux sample was adjusted to an amount that provides a comparable level of viscosity in the end product (see table). The test was carried out by the following protocol:

Preparation & Lumps Measurement:
Bring 2000 g of water to the boil
Add the required amount of roux to the boiling water
Stir with a whisk (15 sec stirring, 15 not stirring, etc) while boiling the water-roux sample for 2 min
after boiling add 1500 g warm water to the boiled water-roux sample mixture and stir carefully, to dilute the sauce and making sieving easier
sieve the complete liquid mixture including roux through the sieve
flush sieve with 500 g warm water, to remove all sauce from the sieve and keep the lumps behind
weigh the sieve containing the lumps
calculate the lump formation by subtracting the weight of the sieve from the weight of the sieve containing the lumps.

The samples and results are indicated in the table below.

| Wheat flour [%] | Crystals (salt + sugar) [%] | Salt [%] | Sugar [%] | Spices (Curry) [%] | fat [%] | Dosage [g/2 L] | Lumps [g] |
|---|---|---|---|---|---|---|---|
| 26 | 8.6 | 5.7 | 2.9 | 35.4 | 30 | 440.0 | 22.0 |
| 26 | 13.3 | 5.9 | 4.4 | 30.7 | 30 | 440.0 | 26.6 |
| 26 | 18 | 12 | 6 | 26 | 30 | 440.0 | 16.5 |
| 26 | 21 | 14 | 7 | 23 | 30 | 440.0 | 14.0 |
| 38.5 | 8.6 | 5.7 | 2.9 | 22.9 | 30 | 340.0 | 22.4 |
| 38.5 | 13.3 | 8.9 | 4.4 | 18.2 | 30 | 340.0 | 11.0 |
| 38.5 | 18 | 12 | 6 | 13.5 | 30 | 340.0 | 7.6 |
| 49 | 21 | 14 | 7 | 0 | 30 | 240.0 | 4.8 |
| 52 | 8.6 | 5.7 | 2.9 | 9.4 | 30 | 240.0 | 6.4 |
| 52 | 13.3 | 8.9 | 4.4 | 4.7 | 30 | 240.0 | 4.7 |
| 52 | 18 | 12 | 6 | 0 | 30 | 240.0 | 3.8 |

From the table it can be concluded that with an increase in the amount of wheat flour the amount of lumps reduced.

The invention claimed is:
1. A process to provide a granular food composition, comprising
from 15 to 50 wt % fat wherein the fat has a solid fat content at 20° C. of between 10 and 90 wt %, based on the weight of the fat,
from 35 to 85 wt % of starch, wherein the starch comprises wheat starch; and wherein at least part of the starch originates from wheat flour,
wherein the food composition comprises gas, and
wherein the density of the composition is less than 1 kg/L at 20° C. comprising the steps of
a. Providing a mixture comprising starch and fat, wherein the starch comprises wheat starch; and wherein at least part of the starch originates from wheat flour,
b. Providing a solid fat content of the fat in the mixture resulting from step a) of higher than 8 wt %, based on the weight of the fat,
c. Including gas in the mixture resulting of step b),
d. Allowing the mixture resulting from step c) to solidify,
e. Shaping the mixture resulting from step d),
wherein step a) further comprises heating the mixture, in case the mixture comprises gluten protein, wherein shaping comprises milling or grating till more than 80 wt % of the particles have a particle size of from 0.5 to 6 mm.

* * * * *